US007384440B2

(12) United States Patent
Takano et al.

(10) Patent No.: US 7,384,440 B2
(45) Date of Patent: Jun. 10, 2008

(54) AIR CLEANER FOR ENGINE OF VEHICLE

(75) Inventors: Kiyohito Takano, Kobe (JP); Yasutaka Kobayashi, Akashi (JP); Kohei Kuyama, Kobe (JP)

(73) Assignee: Kawasaki Jukogyo Kabushiki Kaisha, Kobe-shi (JP)

(*) Notice: Subject to any disclaimer, the term of this patent is extended or adjusted under 35 U.S.C. 154(b) by 480 days.

(21) Appl. No.: 11/114,139

(22) Filed: Apr. 26, 2005

(65) Prior Publication Data

US 2005/0241610 A1 Nov. 3, 2005

(30) Foreign Application Priority Data

Apr. 28, 2004 (JP) ............................ 2004-133855

(51) Int. Cl.
*B01D 46/00* (2006.01)

(52) U.S. Cl. ........................ 55/493; 55/385.3; 55/498; 55/502; 123/198 E

(58) Field of Classification Search ............... 55/385.3, 55/498, 502, 505, 510, DIG. 28, 493; 123/198 E
See application file for complete search history.

(56) References Cited

U.S. PATENT DOCUMENTS

| | | | | |
|---|---|---|---|---|
| 2,848,065 A * | 8/1958 | Sebok | ......................... | 96/381 |
| 3,209,520 A * | 10/1965 | McKinlay | .................... | 96/386 |
| 3,451,584 A * | 6/1969 | Degaetano | .................. | 220/371 |
| 3,546,853 A * | 12/1970 | Claar | .......................... | 55/419 |
| 3,722,182 A * | 3/1973 | Gilbertson | ...................... | 96/52 |
| 4,233,043 A * | 11/1980 | Catterson | ...................... | 55/315 |
| 4,594,083 A * | 6/1986 | Hiraizumi | .................. | 55/385.3 |
| 4,802,902 A * | 2/1989 | Bauerle et al. | ............... | 55/484 |
| 5,062,875 A * | 11/1991 | Nagashima | .................. | 55/493 |
| 5,100,443 A * | 3/1992 | Berto | ........................ | 55/385.3 |
| 6,235,073 B1 * | 5/2001 | Bannister et al. | .......... | 55/385.3 |
| 6,630,007 B2 * | 10/2003 | Hirano et al. | ............. | 55/385.3 |
| 6,840,973 B2 * | 1/2005 | Kuji et al. | ................. | 55/385.3 |
| 6,955,697 B1 * | 10/2005 | Hsu et al. | .................. | 55/385.1 |
| 7,285,148 B2 * | 10/2007 | Daleiden | ................... | 55/385.3 |

FOREIGN PATENT DOCUMENTS

| | | |
|---|---|---|
| JP | A 2003-286916 | 10/2003 |

* cited by examiner

*Primary Examiner*—Duane Smith
*Assistant Examiner*—Robert A Clemente
(74) *Attorney, Agent, or Firm*—Oliff & Berridge, PLC

(57) ABSTRACT

The present air cleaner for an engine of a vehicle, includes: a cleaner case; and a filter assembly disposed in the cleaner case. The filter assembly includes a cylindrical cleaner element, an element supporting member supporting a lower end of the cleaner element and an inner circumferential surface of the cleaner element so that the cleaner element is kept in a predetermined cylindrical shape, and a plate-shaped top cover detachably fastened on an upper surface of the element supporting member so as to press an upper end of the cleaner element downward.

5 Claims, 10 Drawing Sheets

AIR CLEANER FOR ENGINE OF VEHICLE

CROSS REFERENCE TO RELATED APPLICATIONS

This application is based upon and claims the benefit of priority from the prior Japanese Patent Application No. 2004-133855, filed on Apr. 28, 2004, the entire contents of which are incorporated herein by reference.

BACKGROUND OF THE INVENTION

1. Field of the Invention

The present invention relates to an air cleaner for an engine mainly mounted on a straddle-type vehicle such as a straddle-type four-wheel vehicle or a motorcycle.

2. Description of the Related Art

FIG. 10 shows a known air cleaner 100 mounted on a vehicle such as a straddle-type four-wheel vehicle (JP-A 2003-286916). The air cleaner 100 has a cleaner case 101 formed by joining together an upper case member 102 and a lower case member 103. The cleaner case 101 contains a filter assembly 105 therein. A cleaner inlet (air intake port) 110 is formed on the side wall of the lower case member 103. A cleaner outlet (air outlet port) 111 to be connected to a carburetor is formed on the bottom wall of the lower case member 103. Air (the open air) is taken through the air intake port 110 to an inside of the cleaner case 101. The induced air passes through the filter assembly 105 from the outside to the inside so as to be filtered. The filtered air is supplied to the carburetor through the air outlet port 111 on the bottom.

FIG. 11 shows an exploded perspective view of the filter assembly 105 of FIG. 10. The filter assembly 105 includes a lower holder 120 which is made of resin, an upper holder 121 which is made of metal, a top cover 122 which is made of metal, and a cylindrical cleaner element 123 which is made of urethane foam.

The lower holder 120 includes an annular base 131, a plurality of upright support pillars 132 which are integrally formed with the base 131. The base 131 is fastened to the lower case member 103 by bolts 135. Female screw holes 137 are formed on the upper ends of the support pillars 132. The top cover 122 is formed integrally with the upper holder 121 with metal and has bolt through holes 138.

The upper holder 121 is formed in a cylindrical shape corresponding to the cylindrical shape of the cleaner element 123 and has many holes 140 which are made by punching. A wire gauze 141 as a flame arrester is integrally attached to the inner surface of the upper holder 121.

The cleaner element 123 is disposed on the outer surface of the upper holder 121. The upper holder 121 is disposed around the support pillars 132 of the lower holder 120 and is fastened to the upper end of the lower holder 120 with bolts 143. Thereby, the cleaner element 123 is held between the lower surface of the top cover 122 and the upper surface of the base 131.

When the cleaner element 123 is replaced, first, the upper case member 102 is removed. Next, the bolts 143 shown in FIG. 11 are removed, and the upper holder 121 with the top cover 122 and the cleaner element 123 are removed all together. Then, a new cleaner element 123 is disposed on the upper holder 121, and the upper holder 121 with the cleaner element 123 is mounted on the lower holder 120 together with the top cover 122.

As shown in FIG. 11, the top cover 122 of metal, the upper holder 121 of metal, and the wire gauze 141 are formed as an integral unit. Therefore, the manufacturing cost thereof increases due the increased number of assembling steps, and the weight thereof also increases. Moreover, a replacement of the cleaner element 123 requires much work since the integral metal unit including the three members 121, 122, 141 should be removed in order to replace the cleaner element 123.

SUMMARY OF THE INVENTION

Accordingly, it is an object of the present invention to provide an air cleaner for an engine of a vehicle capable of simplifying the structure of and decreasing the weight of a filter assembly disposed in a cleaner case, and of facilitating operations for replacing a cleaner element. Moreover, it is also an object of the present invention to provide an air cleaner capable of securing an air-tightness at an attachment portion of a filter assembly with a simple structure.

The present invention provides an air cleaner including: a cleaner case; and a filter assembly disposed in the cleaner case. The filter assembly includes a cylindrical cleaner element, an element supporting member supporting a lower end of the cleaner element and an inner circumferential surface of the cleaner element so that the cleaner element is kept in a predetermined cylindrical shape, and a plate-shaped top cover detachably fastened on an upper surface of the element supporting member so as to press an upper end of the cleaner element downward.

As mentioned above, in the air cleaner of the present invention, the top cover pressing the upper end of the cleaner element and the element supporting member supporting the inner circumferential surface of the cleaner element are formed separately, and the top cover is formed in a simple plate shape and is detachably fastened on the upper surface of the element supporting member. Therefore, compared with the integral metal unit (121, 122, 141) of the related art shown in FIG. 11, the number of assembling steps for manufacturing the filter assembly can be decreased so that assembling operations can be facilitated when the air cleaner is manufactured. Moreover, operations for replacing a filter element can also be facilitated since only a removal of the plate-shaped top cover is needed in order to replace the filter element. Furthermore, the weight of the air cleaner can be decreased as compared with the air cleaner as a related art shown in FIG. 11.

In the air cleaner according to the present invention, it is preferable that the element supporting member is formed separately from the cleaner case. The element supporting member includes an annular base supporting the lower end of the cleaner element and a circumferential side wall supporting the inner circumferential surface of the cleaner element to keep the cleaner element in the predetermined cylindrical shape. The circumferential wall has a plurality of air passages.

In the air cleaner of the present invention, only the element supporting member can be removed independently so that the removed element supporting member can be replaced or cleaned since the element supporting member having the circumferential side wall with the air passages is formed separately from the cleaner case.

In the air cleaner according to the present invention, it is preferable that the cleaner case includes a lower case member on which an installation seat for the element supporting member is formed. A flame arrester is held together with a sealing member between the installation seat and a lower surface of the annular base of the element supporting member.

In the air cleaner of the present invention, since the flame arrester is formed separately from the element supporting member and the top cover and is held between the lower surface of the base of the element supporting member and the installation seat, the flame arrester is disposed apart from the cleaner element by a fixed distance toward the engine side. Therefore, flames from the engine side can be blocked at a position apart from the cleaner element so as to effectively prevent flames from spreading. Moreover, the element supporting member and the flame arrester can be attached simultaneously so that attaching operations can be facilitated. Costs of parts can be saved since the flame arrester can be replaced independently. Furthermore, only a single sealing member can secure an air-tightness between the installation seat and the element supporting member, and the flame arrester can be attached in a stable condition.

In the air cleaner according to the present invention, it is preferable that an upward protruding rib is formed on the installation seat along a seat surface, with which a lower surface of the sealing member is in contact, of the installation seat. An outer circumferential surface of the sealing member is pressed against an inner circumferential surface of the upward protruding rib.

In the air cleaner of the present invention, since the upward protruding rib is formed on the installation seat along the seat surface thereof with which the lower surface of the sealing member is in contact, and the outer circumferential surface of the sealing member is pressed against the inner circumferential surface of the rib, the sealing member is uniformly compressed over the entire circumference thereof so that an air-tightness can be enhanced.

In the air cleaner according to the present invention, it is preferable that the top cover and the element supporting member are made of resin.

In the air cleaner of the present invention, since the top cover and the element supporting member are made of resin, manufacturing of the air cleaner can be facilitated and the weigh thereof can be decreased.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

General Construction of Vehicle

Figure 1:
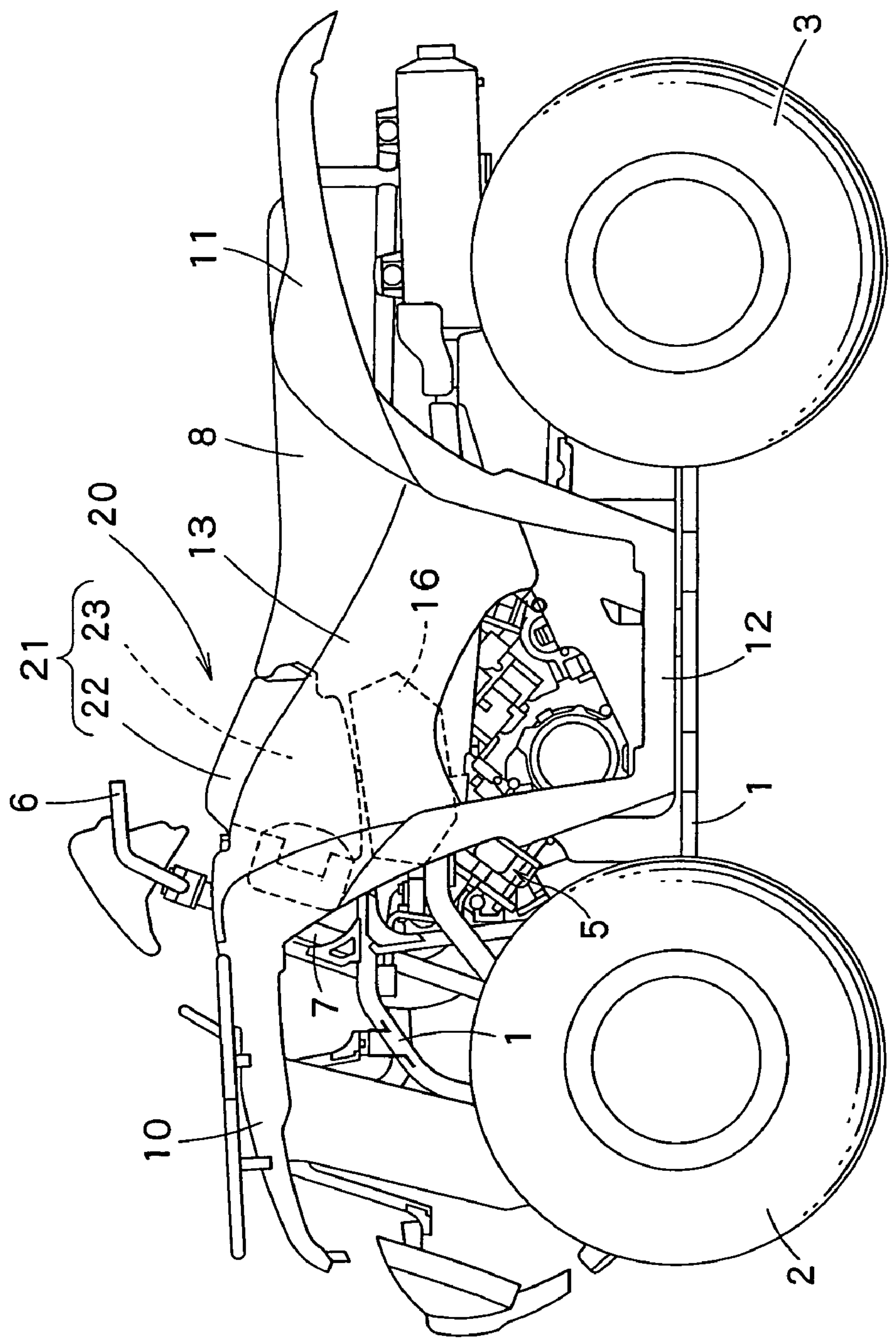
FIG. 1 is a side elevation of a straddle-type four-wheel vehicle provided with an air cleaner in a preferred embodiment according to the present invention taken from the left side of the straddle-type four-wheel vehicle.

Referring to FIG. 1 showing an all-terrain straddle-type four-wheel vehicle provided with an air cleaner 20 in a preferred embodiment according to the present invention, right and left front wheels 2 and right and left rear wheels 3 are suspended from a front part and a rear part, respectively, of a body frame 1, and an engine 5 is supported on the body frame 1 in a space between the front wheels 2 and the rear wheels 3. A steering shaft 7 is disposed in front of the engine 5. A steering handlebar 6 is attached to the upper end of the steering shaft 7. A seat 8 is disposed at an elevated position behind the engine 5. Front fenders 10 and rear fenders 11 are extended over the front wheels 2 and the rear wheels 3, respectively. Foot boards 12 are disposed on the right and the left side, respectively, of the lower end of the engine 5. The right and the left side of an upper part of the engine 5 are covered with side covers 13, respectively.

The engine 5 is a V engine having two banks set at an angle. A carburetor 16 is placed between the two banks. A cleaner case 21 included in the air cleaner 20 is extended in the back-and-forth direction above the carburetor 16 between the steering shaft 7 and the seat 8.

External Construction of Air Cleaner

The cleaner case 21 is formed by joining together an upper case member 22 and a lower case member 23. The lower case member 23 and the carburetor 16 are covered with the right and the left side covers. The upper case member 22 protrudes upward from a plane containing the upper edges of the right and the left side covers 13 so as to be exposed. The upper surface of the upper case member merges smoothly into the upper surface of the seat 8. Thus the upper case member 22 and the seat 8 are decorative components designed to form part of the external shape of the vehicle.

Figure 2:
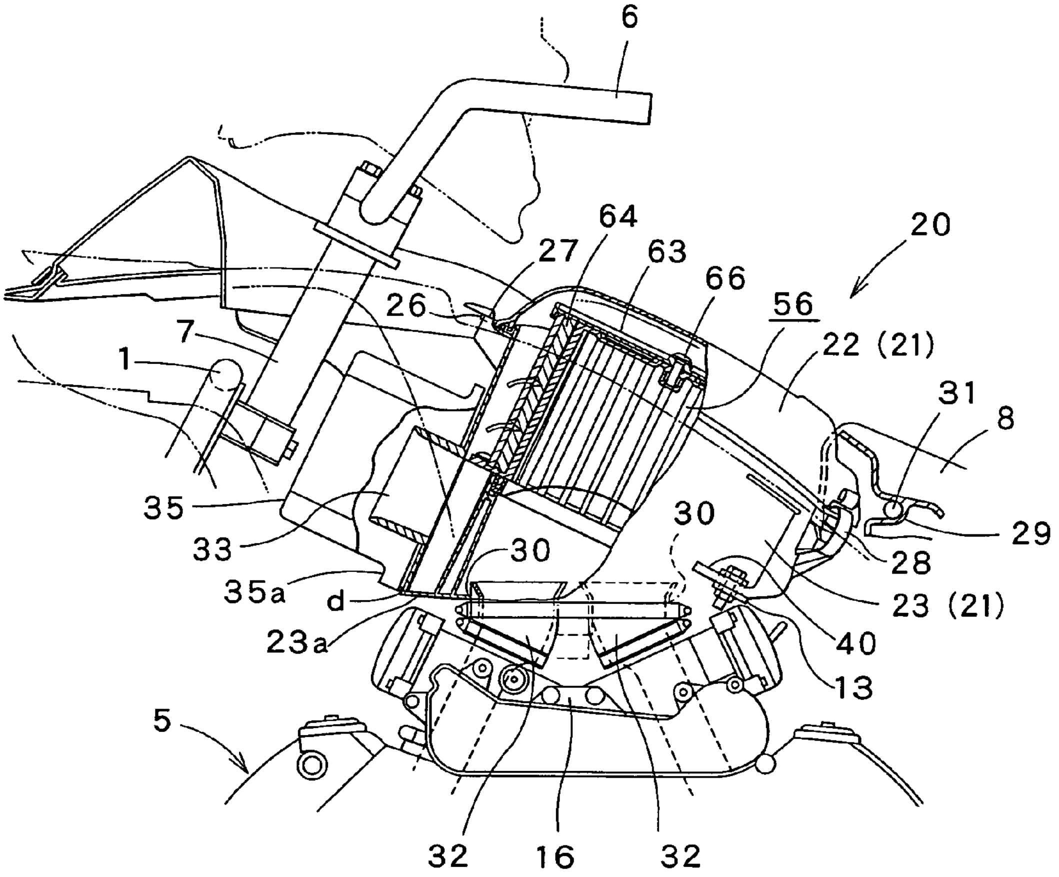
FIG. 2 is a side elevation, partly in vertical section, of the air cleaner shown in FIG. 1 and devices associated with the air cleaner.

Referring to FIG. 2, a filter assembly 56 is held in an upper half part of the lower case member 23. A locking projection 26 is formed integrally with the upper case member 22 so as to project forward from the front end of the upper case member 22. A locking hole 27 is formed in a front end part of the lower case member 23. The locking projection 26 is inserted in the locking hole 27 from behind the locking hole 27. Respective rear end parts of the case members 22 and 23 are separably clamped together with a pair of left and right clamping members 28. A front end part of the seat 8 extends over the upper, the right and the left side of the rear end parts of the case members 22 and 23 clamped by the clamping members 28 so as to cover the rear end parts of the case members 22 and 23 such that the rear end parts of the case members 22 and 23 are concealed from view.

The outward appearance of the vehicle is not ruined even if the upper part of the cleaner case 21 is used as a member constituting a part of the outward appearance of the vehicle since the rear end parts of the case members 22 and 23 and the clamping members 28 are concealed from view by the front end part of the seat 8.

Moreover, operations for attaching and detaching the upper case member 22 is easy since the upper case member 22 is connected to the lower case member 23 by the insertion system including the locking projection 26 and the locking hole 27 at the front end thereof and by the clamping members 28 at the rear end thereof.

The seat is provided with a hook 29 in the front end part thereof. The hook 29 engages with a bar 31 attached to the body frame 1. The rear end part of the seat 8 is releasably locked to the body frame 1 by a locking mechanism, not shown. The seat 8 can be removed from the body frame 1 by releasing the rear end part thereof from the locking mechanism.

In a vertical plane, the lower case member 23 has a trapezoidal shape having a front side of a vertical dimension greater than that of a back side. The lower case member 23 is disposed above the carburetor 16 with its bottom wall 23*a* substantially horizontally extended. Front and rear air outlet ports are formed on the bottom wall 23*a*. The air outlet ports 30 are connected to intake pipes 32 for the front and the rear cylinder of the engine 5 of the carburetor 16, respectively. An inlet port 33 of the air cleaner 20 opening toward the front projects forward from a front, lower part of the lower case member 23. An air intake case is disposed in front of the cleaner case 21 so as to cover the inlet port 33. The air intake case 35 has an open rear end 35*a* and is formed in the shape of a cup. A gap d is formed between the end surface of the open rear end 35*a* and a part of the outer surface, corresponding to the open rear end 35*a*, of the side wall of the lower case member 23.

Figure 3:
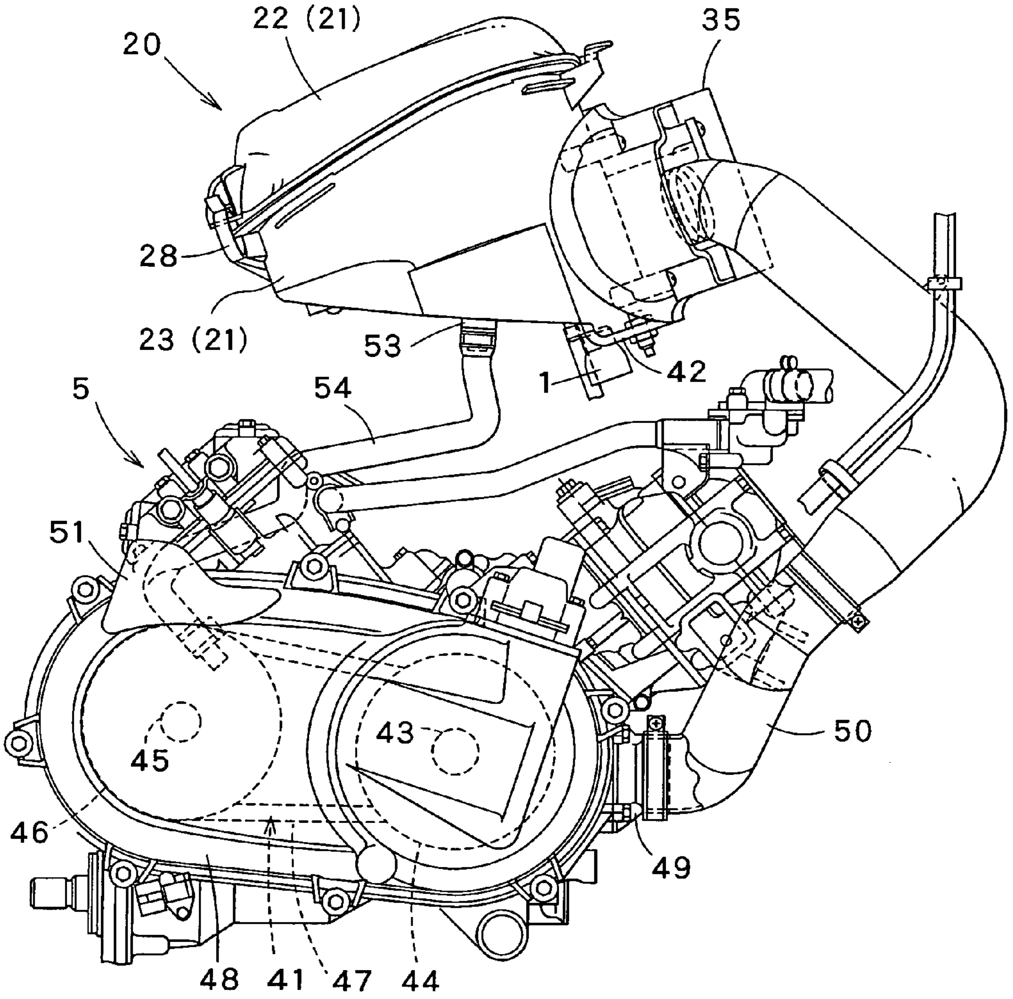
FIG. 3 is a side elevation of an engine and the air cleaner shown in FIG. 1, taken from the right side of the air cleaner.

A bracket 40 formed in, for example, a rear part of the left side surface of the lower case member 23 is fastened to a bracket attached to the side cover 13, and a bracket 42 formed in a front end part of the right side surface of the lower case member 23 is fastened to the body frame 1 as shown in FIG. 3.

Referring to FIG. 3 showing the engine 5 and the air cleaner 20 in a side elevation taken from the right side of the vehicle, a V-belt continuously variable transmission 41 is joined to the right side surface of the engine 5. The transmission 41 includes a drive pulley 44 interlocked with an output shaft 43 of the engine 5, a driven pulley 46 mounted on an input shaft 45 of a gear transmission (not shown), and a V belt 47 extended between the pulleys 44 and 46. The drive pulley 44, the driven pulley 46 and the V belt 47 are covered with a belt cover 48. A cooling air intake port 49 is formed on a front end part of the belt cover 48. The cooling air intake port 49 is connected to the air intake case 35 by an air intake duct 50 for taking in a cooling air. A cooling air discharge port 51 projects upward from a rear end part of the belt cover 48. A breather port 53 projects from the lower surface of the lower case member 23 of the cleaner case 21. The breather port 53 communicates with the interior of the engine 5 by means of a breather pipe 54.

Internal Construction of Air Cleaner

Figure 4:
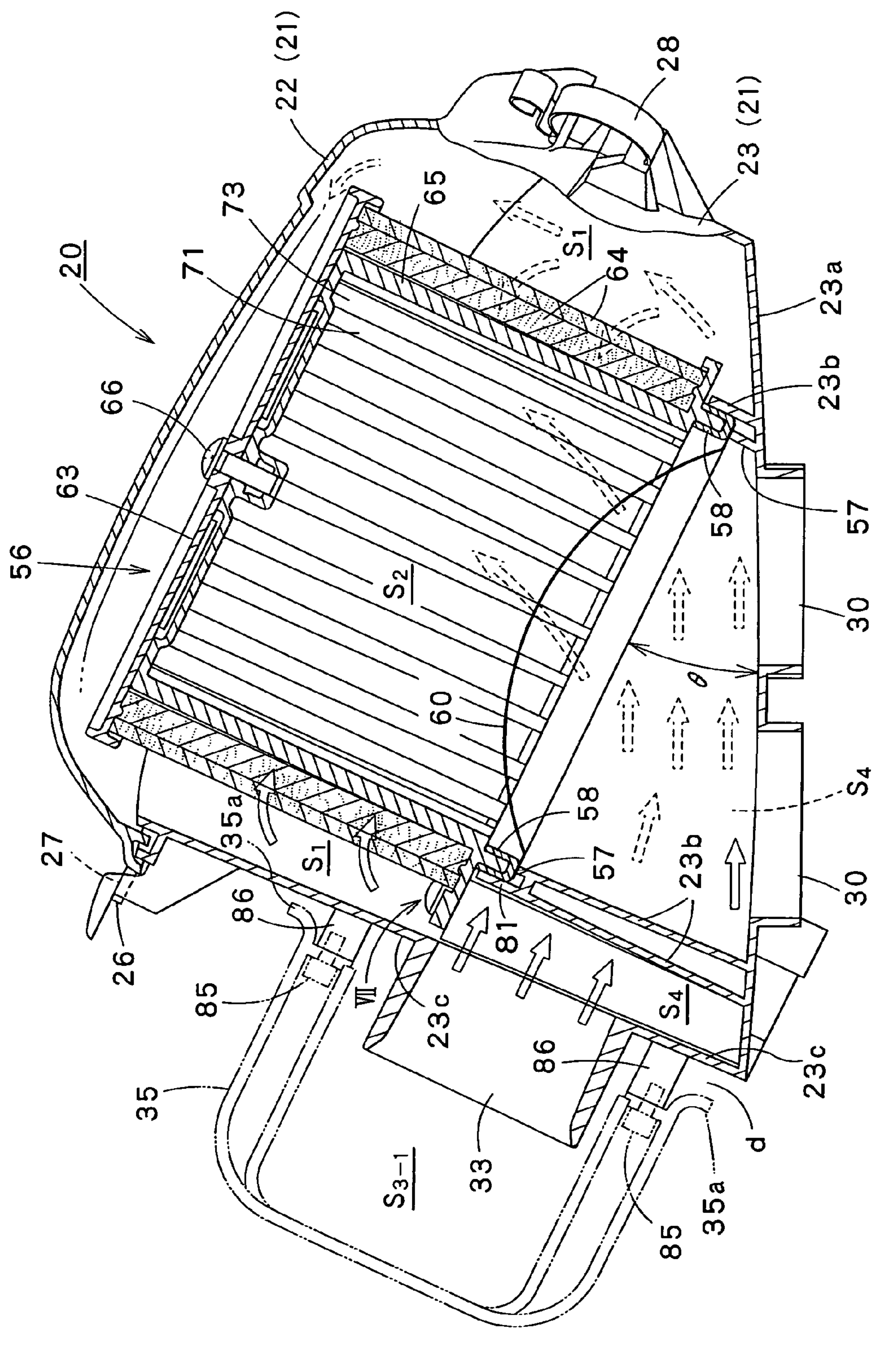
FIG. 4 is an enlarged vertical sectional view of the air cleaner shown in FIG. 1 taken from the left side of the air cleaner.

Referring to FIG. 4 showing the air cleaner 20 in a vertical sectional view taken from the left side, a cylindrical support wall 23*b* is formed integrally with the bottom wall 23*a* of the lower case member 23 so as to rise obliquely upward from the bottom wall 23*a*. An installation seat 57 is formed at the upper end of the support wall 23*b*. The filter assembly 56 is seated on the installation seat 57 through a rubber trim seal 58. A peripheral part of a flame arrester 60 formed from a wire net is held between the installation seat 57 and the trim seal 58. A central part of the flame arrester 60 is formed in an upward convex spherical shape. The cylindrical support wall 23*b* is a double-wall structure rising obliquely backward substantially parallel to the front end surface 23*c* of the lower case member 23*a*. The installation seat 57 formed at the upper end of the support wall 23*b* is inclined at an angle θ to a horizontal plane such that the installation seat 57 slopes down backward. The front end part of the support wall 23*b* is opposed to the inlet port 33 from behind the inlet port 33. The height of a lower air chamber S4 surrounding the support wall 23*b* decreases backward. Thus the distance between the bottom wall 23*a* and the filter assembly 56 decreases backward.

Filter Assembly

Figure 5:
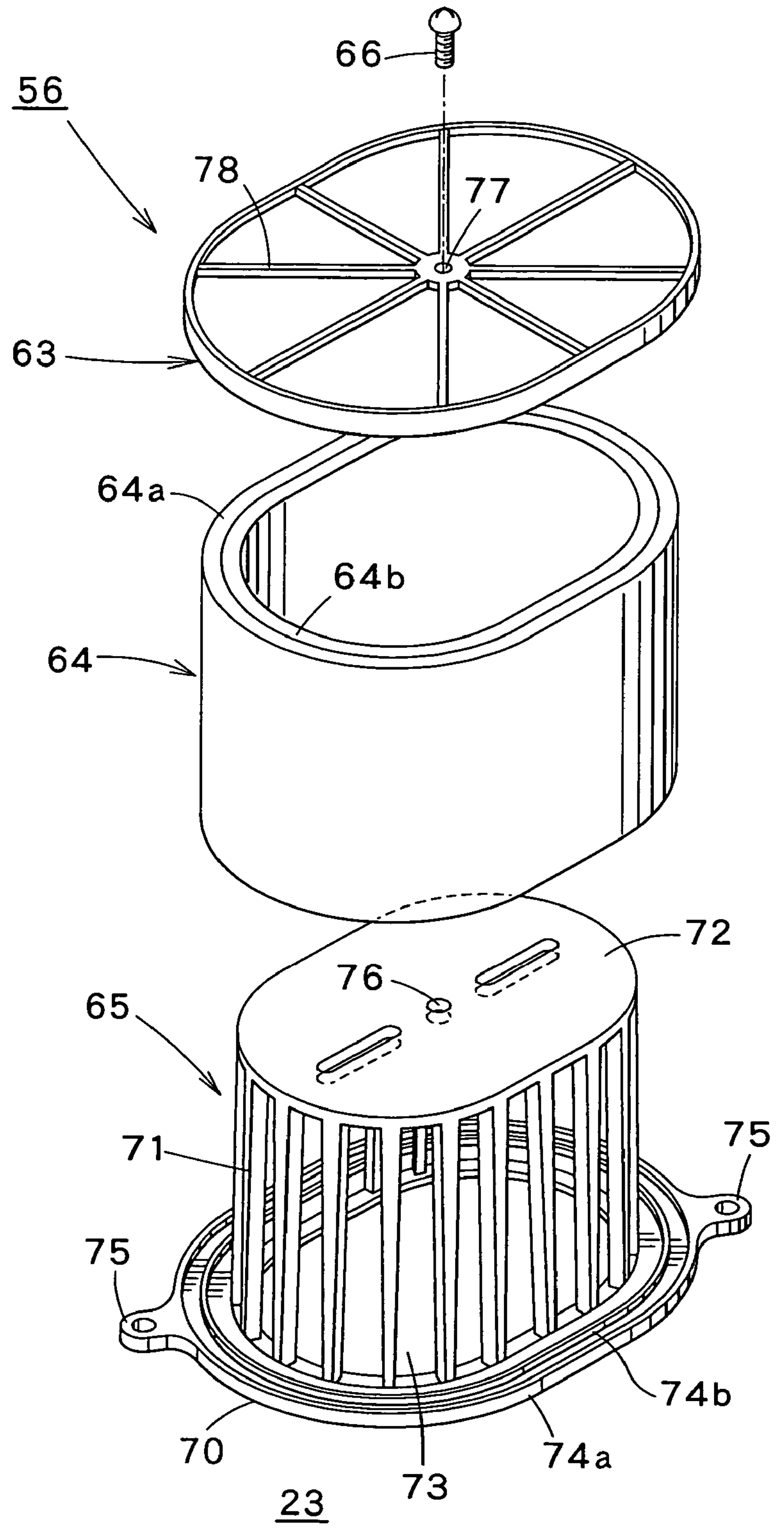
FIG. 5 is an exploded perspective view of a filter assembly included in the air cleaner shown in FIG. 1.

Referring to FIG. 5 showing the filter assembly 56 in an exploded perspective view, the filter assembly 56 includes a cylindrical cleaner element 64 formed from urethane foam sheets, a support frame (element supporting member) 65 of a resin, supporting the cleaner element 64 thereon and keeping the cleaner element 64 in a predetermined cylindrical shape, and a flat, resin top cover 63 fastened to the support frame 65 with a bolt 66 to hold the cleaner element 64 in place on the support frame 65. The cleaner element 64 has an oblong shape extending in the back-and-forth direction in a horizontal plane. The cleaner element 64 is a two-layer structure consisting of a coarse outer layer 64*a* and a fine inner layer 64*b*.

The support frame 65 has an annular base 70 on which the cleaner element 64 is supported, a side wall 71 for keeping the cleaner element 64 in the shape of an elliptic cylinder and a top wall 72. The base 70, the side wall 71 and the top wall 72 are formed integrally.

The side wall 71 is a grating. The side wall 71 is provided with a plurality of slit air passages 73 circumferentially arranged at fixed intervals. The slit air passages 73 extend between the base 70 and the top wall 72. The base 70 is provided integrally with ribs 74*a* and 74*b* extending along the outer edge of the base 70 and in a middle part, with respect to the width, of the base 70, respectively, to determined the position of the lower end of the cleaner element 64 on the base 70. The base 70 is provided with a pair of opposite tabs 75. The tabs 75 are fastened to the lower case member 23. A threaded hole 76 is formed in a central part of the top wall 72. The bolt 66 is screwed in the threaded hole 76 to fasten the top cover 63 to the support frame 65.

The top cover 63 is a flat resin plate of an oblong shape corresponding to that of a horizontal section of the cleaner element 64 having a central boss provided with a through hole 77 and radial arms 78 radially extending from the central boss.

Figure 7:
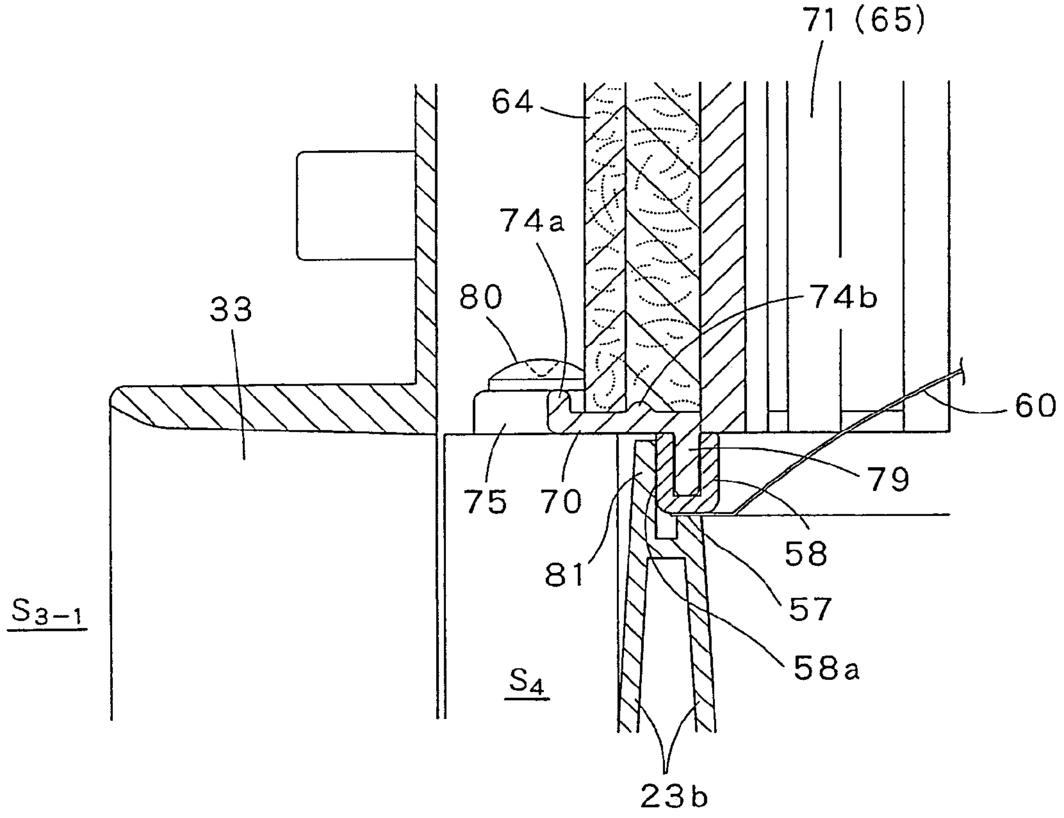
FIG. 7 is an enlarged view of a part indicated by the arrow VII in FIG. 4.

Referring to FIG. 7, the base 70 of the support frame 65 is integrally provided on its lower surface with a downward protruding rib 79 extending along the entire perimeter of the base 70. The rubber trim seal 58 having a U-shaped cross section is put on the rib 79. An upward protruding oblong rib 81 is formed on the radially outer side of the installation seat 57 of the support wall 23*b* along the entire perimeter of the installation seat 57. The rib 81 and the installation seat 57 are spaced apart by an oblong groove.

The base 70 of the support frame 65 is seated on the installation seat 57. The trim seal 58 and the peripheral part of the flame arrester 60 are held between the installation seat 57 and the base 70. The tabs 75 are fastened to the lower case member 23 with bolts 80. The outer side surface 58*a* of the trim seal 58 is pressed against the inner side surface of the upward protruding oblong rib 81. Thus the trim seal 58 is kept in a predetermined cylindrical shape and is uniformly compressed.

Figure 6:
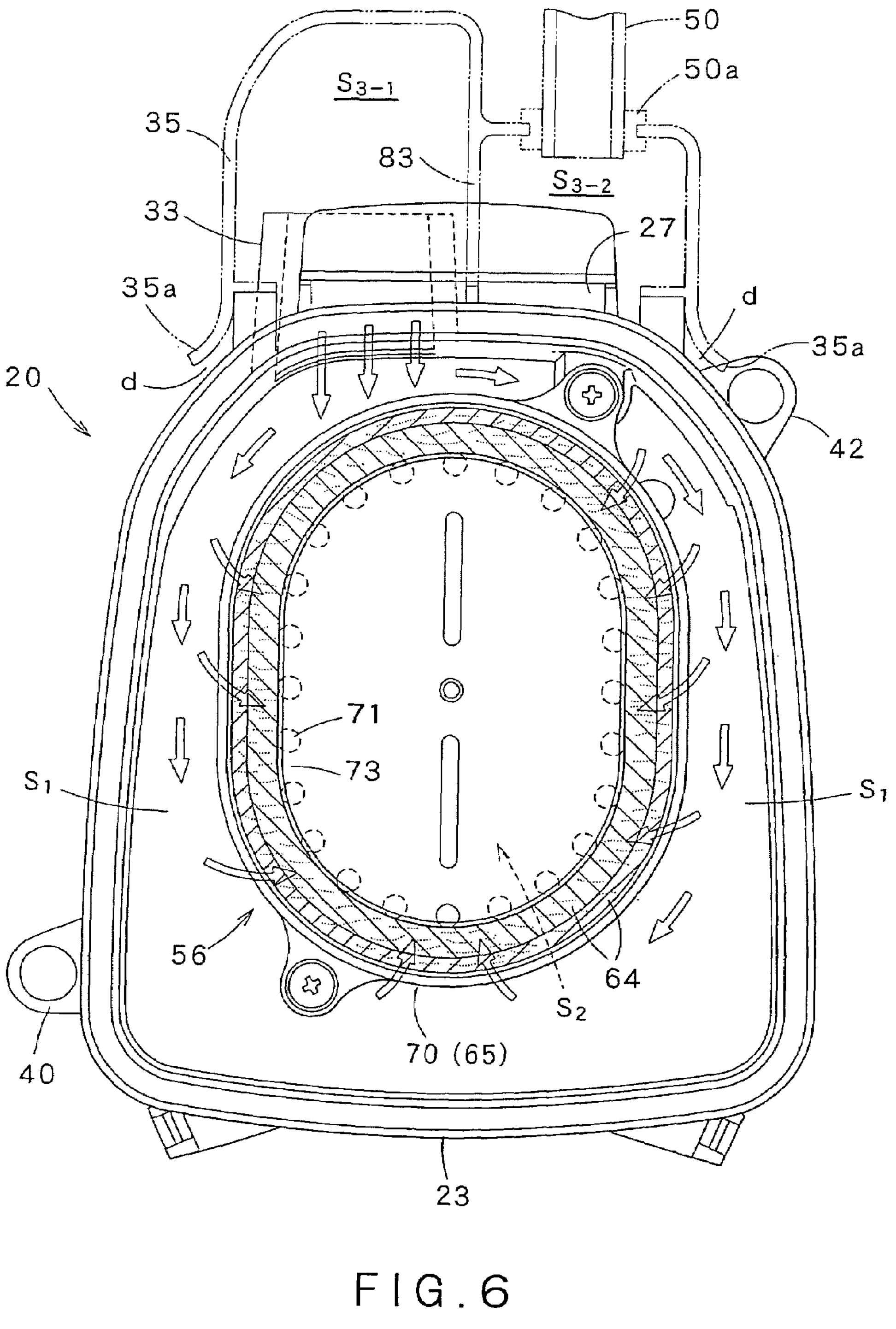
FIG. 6 is a plan view of the air cleaner shown in FIG. 1, in which an upper case member is removed.

FIG. 6 is a plan view of the air cleaner 20, in which the upper case member 22 is removed. An outer air chamber S1, namely, an intake air chamber, is formed around the filter assembly 56 along the entire perimeter of the filter assembly 56 so as to be connected to the lower air chamber S4 shown in FIG. 4. An inner air chamber S2, namely, clean air chamber, is formed in the filter assembly 56.

Air Intake Structure of Air Cleaner

Figure 8:
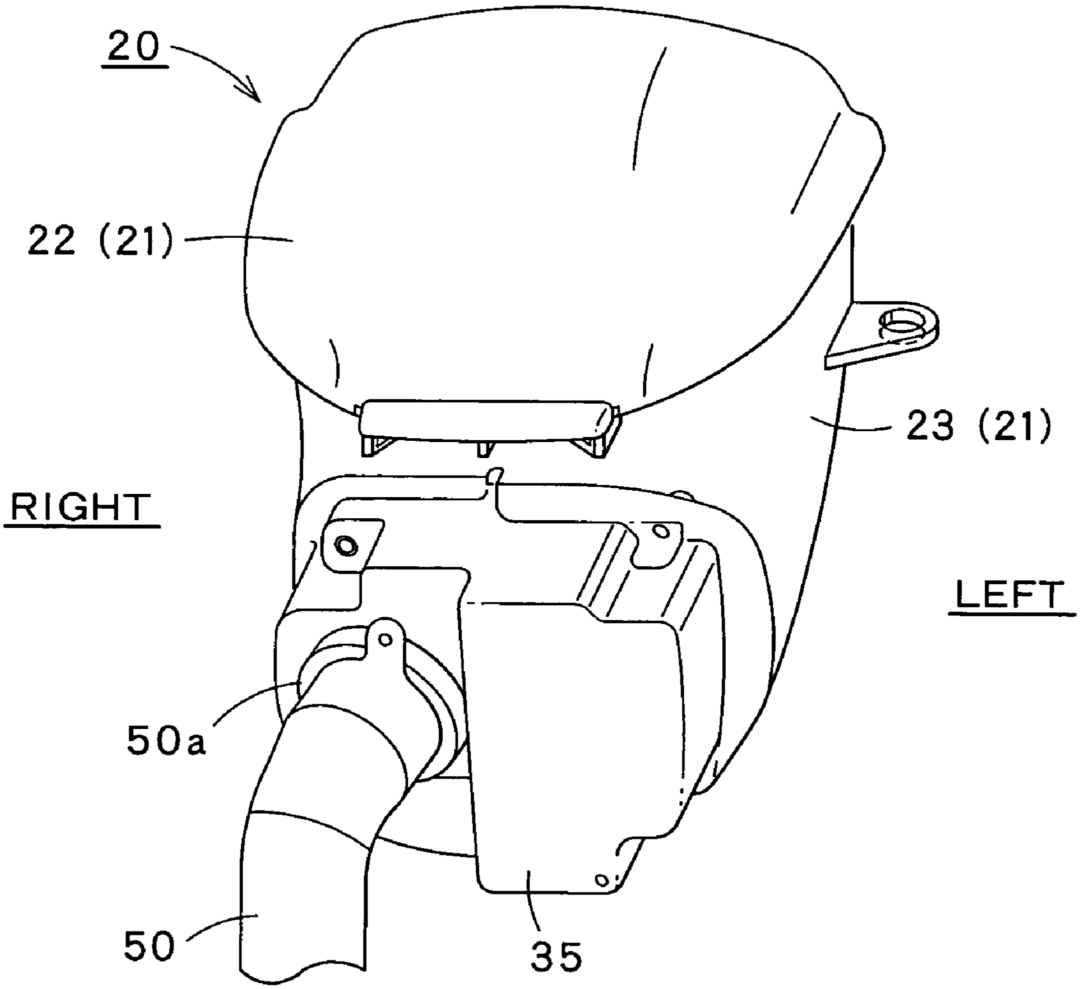
FIG. 8 is a perspective view of the air cleaner shown in FIG. 1.
Figure 9:
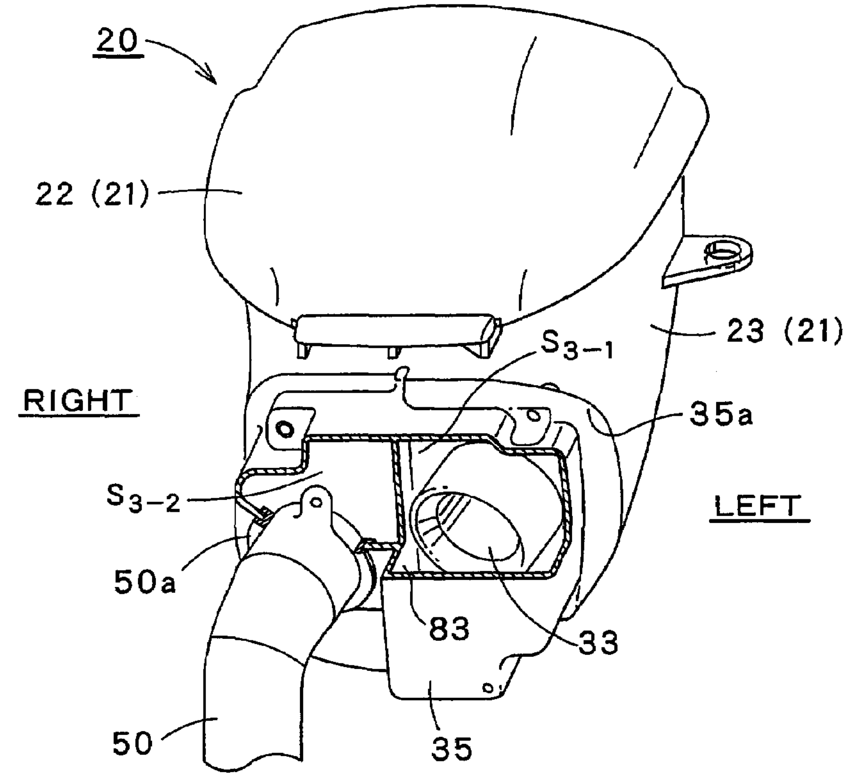
FIG. 9 is a partly cutaway perspective view, similar to FIG. 8, of the air cleaner.
Figure 10:
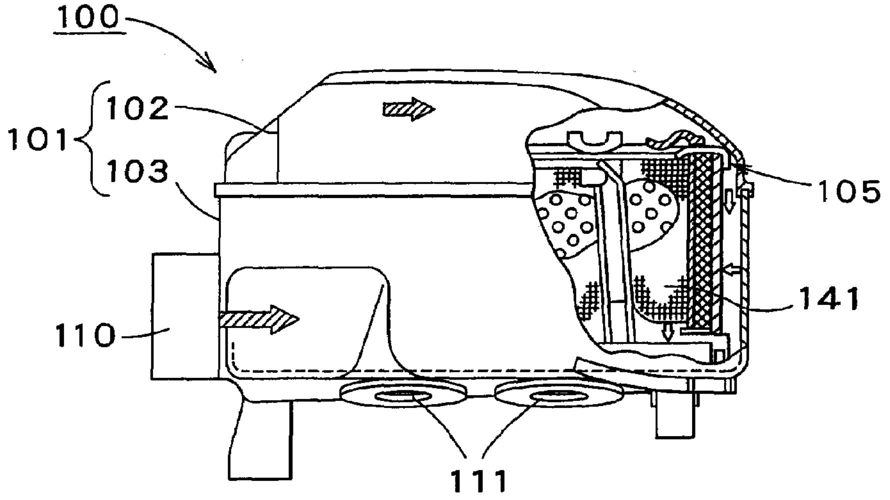
FIG. 10 RELATED ART
FIG. 10 is a vertical fragmentary sectional view of an air cleaner as a related art.

FIG. 8 is a perspective view of the air cleaner 20 and FIG. 9 is a perspective view of the air cleaner 20 on which an upper front part of the air intake case 35 is cut away. Referring to FIG. 9, the interior of the air intake case 35 is divided into a cooling air chamber S3-2 on the right side of the vehicle and an intake air chamber S3-1 on the left side of the vehicle by a partition wall 83 formed integrally with the intake air case 35. The cooling air duct 50 is connected to the cooling air chamber S3-2 to induce cooling air for cooling the V-belt continuously variable transmission 41 through the cooling air chamber S3-2. The cooling air duct 50 is connected to the air intake case 35 by a rubber sealing ring 50*a*. One part, corresponding to the intake air chamber S3-1, of the front wall of the intake air case 35 lies ahead of a plane containing the other part, corresponding to the cooling air chamber S3-2, of the front wall of the intake air case. The intake air chamber S3-1 has a volume greater than that of the cooling air chamber S3-2. The inlet port 33 of the air cleaner projects into the air intake chamber S3-1.

As shown in FIG. 4, the air intake case 35 is fastened to a boss 86 formed on the lower case member 23 with a plurality of bolts 85. As mentioned above, the gap d is formed between the end surface of the open rear end 35*a* of the air intake case 35 and the outer surface of the side wall of the lower case member 23. Air flows through the gap d into the air intake chamber S3-1 and the cooling air chamber S3-2.

Procedure for Changing Cleaner Element (1) Referring to FIG. 2, the locking mechanism, not shown, locking the rear end of the seat 8 is unfastened, the hook 29 is disengaged from the bar 31, and the seat 8 is removed to expose the clamp member 28 clamping the respective rear end parts of the case members 22 and 23. Then, the clamping member 28 is removed, the locking projection 26 formed integrally with the upper case member 22 is extracted from the locking hole 27 formed in the front end part of the lower case member 23, and the upper case member 22 is removed.

Figure 11:
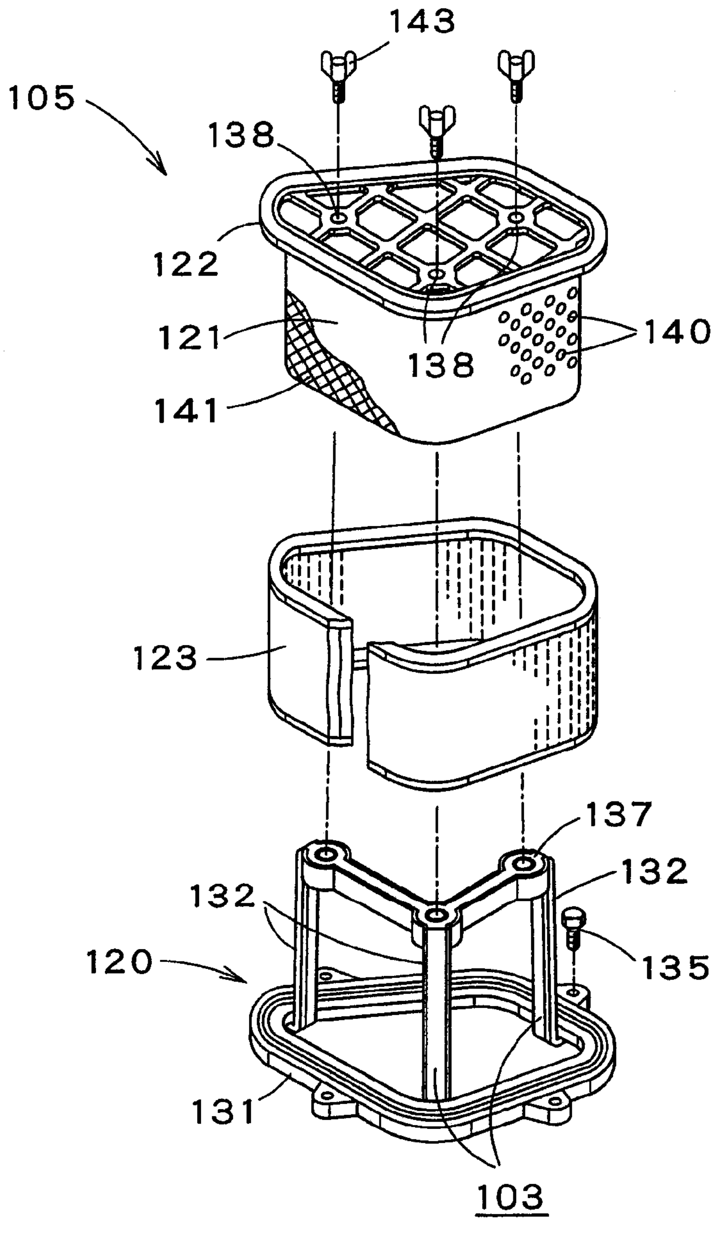
FIG. 11 RELATED ART
FIG. 11 is an exploded perspective view of a filter assembly included in the air cleaner shown in FIG. 10.

(2) The bolt 66 is removed and the flat, resin top cover 63 is removed. Thus the cleaner element 64 can be removed. The cleaner element 64 can be removed more easily than the complicated, heavy integral structure of the air cleaner shown in FIG. 11 as a related art.

(3) Subsequently, only the cleaner element 64 is removed from the support frame 65 out by pulling up the cleaner element 64 relative to the side wall 71 of the support frame 65. Then, a new cleaner element 64 is put on the side wall 71 of the support frame 65.

(4) The top cover 63 is put on the top wall 72 of the support frame 65 and is fastened to the top wall 72 with the bolt 66 to press the upper and the lower end of the cleaner element 64 against the top cover 63 and the base 70.

Change of Flame Arrester

A peripheral part of the flame arrester 60 is held between the base 70 of the support frame 65 and the installation seat 57 of the support wall 23*b*. The flame arrester 60 can be replaced with a new one after removing the support frame 65 from the lower case member 23. Since only the flame arrester 60 can be changed, cost of parts can be saved.

Air Flow in Air Cleaner (1) Referring to FIG. 4, air flows through the gap d between the end surface of the open rear end 35*a* of the air intake case 35 and the outer surface of the side wall of the lower case member 23 into the intake air chamber S3-1 and the cooling air chamber S3-2. Since air is thus taken into the air cleaner 20 through the gap d, entrance of water and mud into the air cleaner 20 can be prevented. Since the gap d corresponds to the entire perimeter of the open rear end 35*a* of the air intake case 35, sufficient air is able to flow into the air cleaner 20.

(2) Air flowed into the intake air chamber S3-1 flows through the inlet port 33 into the lower air chamber S4 of the cleaner case 21 and impinges on the front end of the support wall 23*b* immediately after flowing into the lower air chamber 54. Consequently, water and mud contained in the induced air can be separated from air.

(3) Then, the induced air flows smoothly rearward along the right and the left surfaces of the support wall 23*b* in the lower air chamber S4 because the flowing direction of the induced air is not changed sharply. Then, the induced air flows gradually into the outer air chamber S1 surrounding the filter assembly 56 as the induced air flows rearward in the lower air chamber S4. Thus the induced air is distributed over the outer surface of the filter assembly 56. Part of the induced air flows in a tumbling flow from an upper region above the filter assembly 56 into a front region in front of the filter assembly.

(4) Referring to FIG. 6, as the induced air flows through all parts of the cleaner element 64 of the filter assembly 56 into the inner air chamber S2, the cleaner element 64 filters the induced air. The filtered, induced air flows through the outlet ports 30 (FIG. 2) formed on the bottom wall 23*a* into the air intake pipes 32 of the carburetor.

(5) The induced air flowed into the cooling air chamber S3-2 flows through the cooling air duct 50 into the space covered with the belt cover 48 to cool the transmission 41. The induced air cooled the transmission 41 is discharged outside through the discharge port 51.

Although the top wall 72 of the support frame (element supporting member) 65 shown in FIG. 5 is configured to cover the entire upper end of the circumferential side wall 71, the top wall may be structured in a frame shape. The necessary functions required for the side wall 71 are to support the cleaner element 64 to keep it in a cylindrical shape and to allow air to pass through the side wall 71. Accordingly, the side wall 71 of the support frame 65 may be structured in a lattice shape. The air passage 73 may be structured in a circle or elliptic shape, etc., instead of a vertically extending slit shape.

The support frame 65 may be molded with resin integrally with the lower case member 23. In this case, the flame arrester is attached to, for example, the air outlet port (cleaner outlet) shown in FIG. 4.

Although the air cleaner 20 shown in FIG. 1 is disposed such that the bottom wall 23*a* of the lower case member 23 is set horizontally and the upper end surface of the upper case member 22 is sloped upward in the forward direction, the bottom wall 23*a* of the lower case member 23 may be sloped down forward and the upper end surface of the upper case member 22 may be set horizontally.

Moreover, although in the air cleaner 20, the air intake case 35 is disposed on the side wall of the cleaner case 21 as shown in FIG. 4, a duct may be connected to the inlet port 33 so that the open end of the duct is disposed at a location where water and mud cannot enter the open end of the duct easily.

The horizontal sectional shape of the cleaner element 64 is not limited to the oblong shape as shown in FIG. 5. The cleaner element 64 may have any suitable horizontal sectional shape, such as an elliptic or circular horizontal sectional shape.

The air cleaner of the present invention is applicable not only to an engine of a straddle-type four-wheel vehicle but also to the engines of various straddle-type vehicles including motor cycles and to the other engines.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. An air cleaner for an engine of a vehicle, comprising:

a cleaner case; and a filter assembly disposed in the cleaner case, the filter assembly including a cylindrical cleaner element, an element supporting member supporting a lower end of the cleaner element and an inner circumferential surface of the cleaner element so that the cleaner element is kept in a predetermined cylindrical shape, and a plate-shaped top cover detachably fastened on an upper surface of the element supporting member so as to press an upper end of the cleaner element downward.

2. The air cleaner according to claim 1, wherein the element supporting member is formed separately from the cleaner case, the element supporting member including an annular base supporting the lower end of the cleaner element and a circumferential side wall supporting the inner circumferential surface of the cleaner element to keep the cleaner element in the predetermined cylindrical shape, the circumferential wall having a plurality of air passages.

3. The air cleaner according to claim 2, wherein the cleaner case includes a lower case member on which an installation seat for the element supporting member is formed, a flame arrester being held together with a sealing member between the installation seat and a lower surface of the annular base of the element supporting member.

4. The air cleaner according to claim 3, wherein an upward protruding rib is formed on the installation seat along a seat surface, with which a lower surface of the sealing member is in contact, of the installation seat, an outer circumferential surface of the sealing member being pressed against an inner circumferential surface of the upward protruding rib.

5. The air cleaner according to claim 1, the top cover and the element supporting member are made of resin.

* * * * *